Aug. 1, 1933.  I. T. BENNETT  1,920,778
CASING OR COVER FOR RADIATORS
Filed Nov. 16, 1927   3 Sheets-Sheet 1

INVENTOR
IRVING T. BENNETT.
BY
D. Anthony Usina, ATTORNEY

Aug. 1, 1933.  I. T. BENNETT  1,920,778
CASING OR COVER FOR RADIATORS
Filed Nov. 16, 1927  3 Sheets-Sheet 2

INVENTOR
IRVING T. BENNETT.
BY
D. Anthony Usina, ATTORNEY

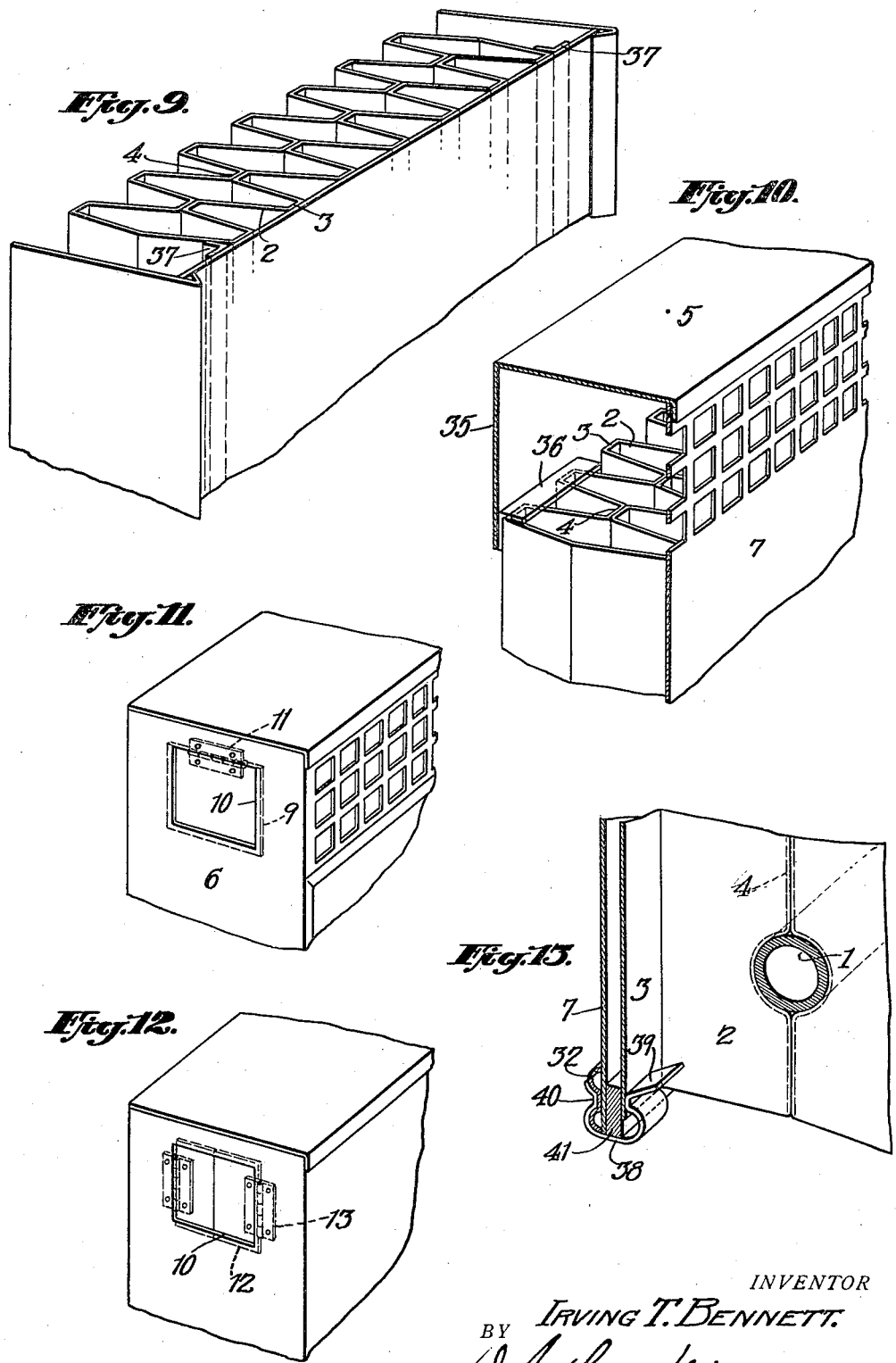

Patented Aug. 1, 1933

1,920,778

UNITED STATES PATENT OFFICE 1,920,778

CASING OR COVER FOR RADIATORS

Irving T. Bennett, Brooklyn, N. Y., assignor, by mesne assignments, to American Radiator & Standard Sanitary Corporation, a Corporation of Delaware Application November 16, 1927. Serial No. 233,594

3 Claims. (Cl. 237—79)

With radiators for heating or cooling the air of a room, it is desirable to provide a casing or cover to protect the parts of the radiator proper, to secure an improved appearance and to serve other purposes referred to in detail hereinafter.

The present invention provides such a casing or cover, adapted to radiators of various types, and particularly useful in combination with the Murray type of radiator of which an example is illustrated in a Murray & Bennett application No. 168,272 filed February 15, 1927.

The accompanying drawings illustrate embodiments of the invention.

Fig. 9 is a perspective view with the top removed;

Fig. 10 is a perspective view with the end portion of the casing in section;

Figs. 11 and 12 are perspective views of alternative constructions of an end of the casing;

Fig. 13 shows in perspective the arrangement of a steadying clip.

The Murray radiator is characterized by horizontal, longitudinal heating elements to which is applied a radiating structure forming vertical flues and channels in which the air is heated and a rapid circulation is induced.

In the example illustrated, the heating elements are steam pipes 1 (or they may carry cold brine when the radiator is used for cooling). The radiating structure consists of corrugated plates, Figs. 9 and 10, for example, which embrace the heating elements and provide slightly oblique transverse fins 2 united alternately at their outer edges by webs 3 and at their inner edges by webs 4.

Such radiators are designed to be installed against a wall, and after installation to be covered by a casing as indicated in Figs. 1 to 5.

Figure 1:
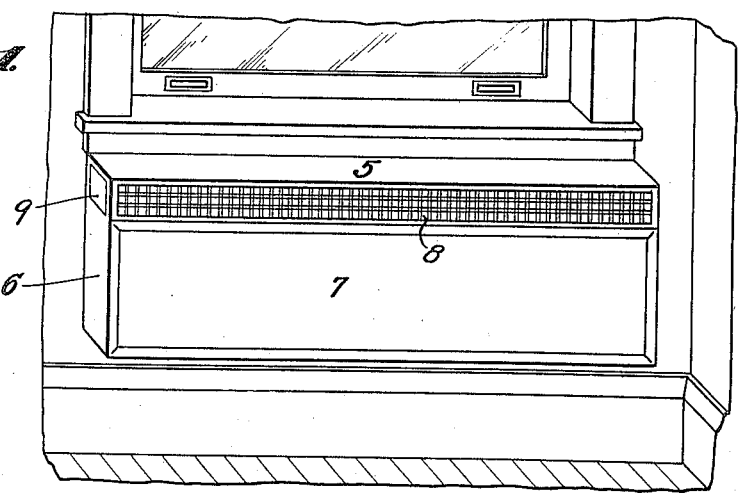
Figs. 1, 2 and 3 are perspective views of different styles of casing.

Fig. 1 illustrates the largest style of casing, covering the valves and pipes at the end of the radiator proper, extending a slight distance above the radiator and ejecting the heated air at the front.

Figures 3, 4:
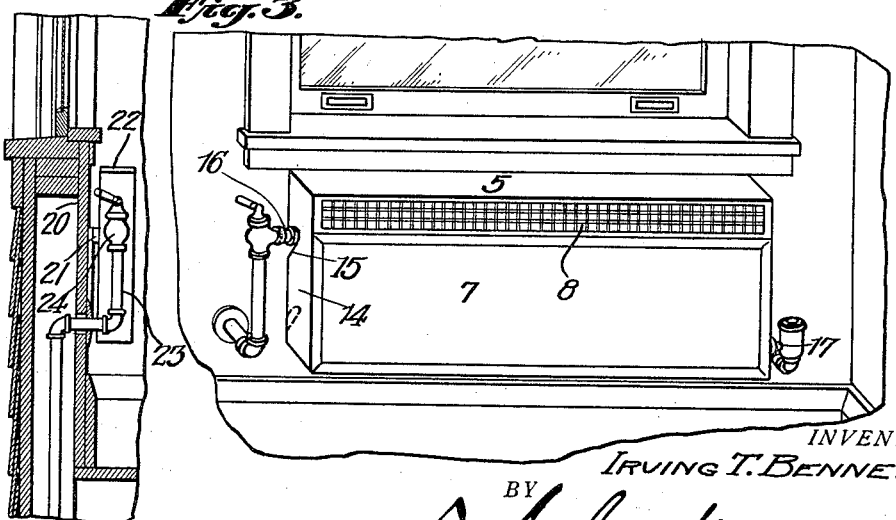
Fig. 4 is a vertical transverse section of Fig. 3, showing the encased radiator in elevation.

In Fig. 3 there is shown the same type of casing except that it is made shorter and does not enclose the valves and pipes projecting from the ends of the radiator. These front-discharge casings are to be used in locations where a top-discharge might be objectionable as tending to discolor the wall, or for other reasons.

Figure 2:
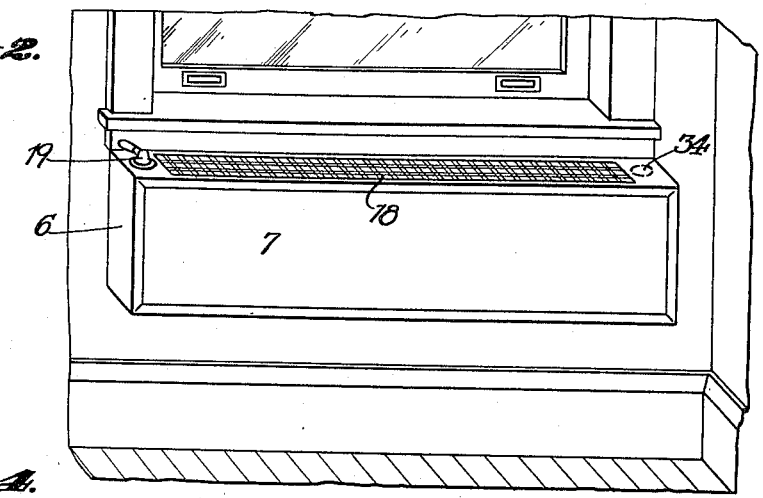
Figure 5:
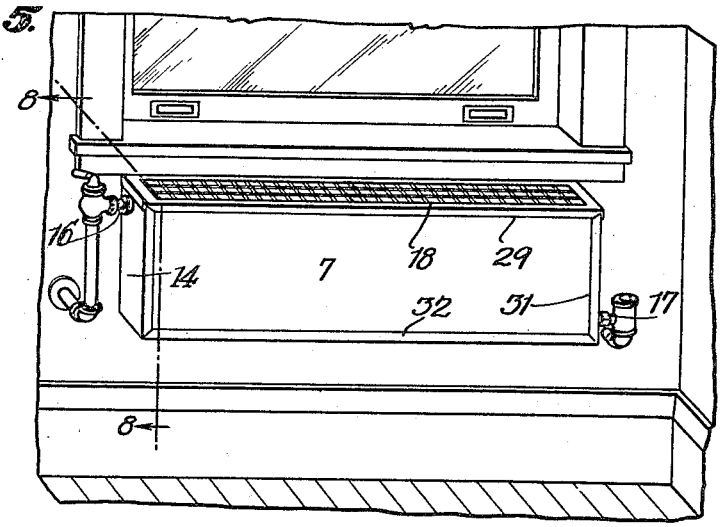
Fig. 5 is a perspective of another style.

In Figs. 2 and 5, casings with a top-discharge are illustrated; Fig. 2 illustrating a casing which completely encloses the projecting pipes and valves, and Fig. 5 illustrating the same casing shortened so as to leave these projecting parts exposed.

Referring to Fig. 1, the casing comprises a top wall 5, end walls 6 and a front wall or panel 7, at the upper edge of which is located a perforated plate or grating 8 for emission of the heated air. In each of the end walls, 6, is located a shutter 9 normally closing an opening through which access can be had to the steam valve within. Such a shutter is shown in Fig. 11. It is located on the inner side of the end wall 6 so as to close the opening 10, being attached at its upper edge by a spring hinge 11 which holds it normally closed. Or, where the space for swinging the shutter is limited, a pair of narrow shutters 12, Fig. 12, may be arranged to close the opening 10, being fastened on the inner side of the plate through spring hinges 13 at their outer edges.

Fig. 3 shows the top wall 5, front panel 7 and grating 8, the same as in Fig. 1, except that they are less in length. The end walls 14 are provided with oblique slots 15 open at the rear edge of the wall to permit passing of the latter across a projecting pipe, such as the inlet pipe 16. A similar oblique slot at the lower part of the opposite end wall accommodates the outlet pipe 17.

In Fig. 2 the top wall 18 is punched to form a grating for permitting the escape of the heated air upward. Plain end walls 6 are used. The casing is long enough to embrace the pipes and fittings projecting at the ends. The steam valve, however, has a stem 19 projecting through an opening in the top wall 18 and a handle applied for opening and closing the valve. This is the only projecting part of the radiator.

Figure 5 shows a front panel 7 and a top plate 18, the same as in Fig. 2, but shorter. The end plates 14 are provided with oblique slots open at the rear edges so as to permit the end plates to be placed across the pipes 16 and 17.

It is assumed that the radiator is supported above the floor, which gives free access to fresh air through the open bottom, and which is preferred because it leaves the floor of the room clear and easier to be kept clean.

Fig. 4 illustrates this arrangement. On the wall 20 there is a hanger 21 which supports the radiator in a position close to the wall, the encased radiator being indicated as a whole by the numeral 22.

It will be understood that the back and bottom of the casing will be open. The steam pipe 23 projects at a proper level from the wall and is carried up to the valve 24 which leads through the inlet pipe 16 to the radiator.

The casing is a unitary transportable structure applicable to the radiator after the latter has been installed and adapted to be supported by the radiator; so that, when the latter is suspended above the floor as indicated, the lower edge of the casing may also clear the floor.

The casing may be simply and economically made of sheet metal, such as copper, brass or steel, grained to harmonize with the furniture or woodwork in a room, or painted so as to harmonize with the color of the wall or decorated according to any desired scheme.

In applying the casing to the radiator, nothing more is necessary than to slip it in place by a downward movement over the top of the radiator. It protects the radiator against injury.

The Murray radiators referred to are generally made of extremely thin copper or other sheet metal which is liable to distortion by a slight blow so that a protective casing is particularly useful with this type of radiator. The material and method of production make it possible to manufacture the casing very cheaply.

Figure 6:
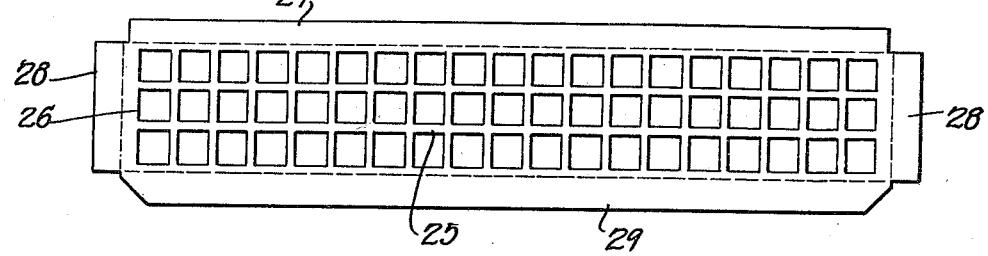
Figs. 6 and 7 are plans of blanks for the top and ends of the casing respectively.

The top plate may be made of a blank 25 shown in Fig. 6, with openings 26 punched therein where the heated air is to be discharged through the top. A rear flange 27 is bent down sufficiently to embrace the rear face of the radiator, as in Fig. 8. End flanges 28 are also bent down to fit against the inner face of the end walls. And a front flange 29 is bent down and preferably molded into graceful shape to overlap the front panel 7.

Figure 7:
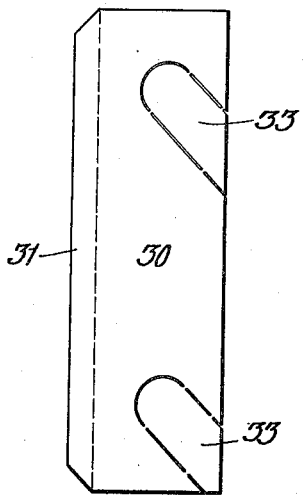

The blank 30 for an end plate is shown in Fig. 7, with a flange 31 at the front edge which is bent over the vertical edges of the front panel and molded to match the molding 29 of the top plate. The lower edge of the front panel is formed with a corresponding molding 32. These flanged and molded edges are not only ornamental, but give a desired stiffness to the front panel. And the centre may be embossed or otherwise ornamented and stiffened.

The blanks of Figs. 6 and 7 are dimensioned for the casing of Fig. 5. The end plates are provided with knock-outs 33 near the top and bottom. Along the edges of these knock-outs the metal is partly cut through so that a workman with a pair of pliers can readily remove one or the other of them as the situation may require. For the installation of Fig. 5, the upper knock-out 33 will be removed at the left-hand end, and the lower knock-out at the right-hand end, corresponding with the positions of the projecting steam pipes. Where the location of the steam pipes is the same for a large number of radiators, the end plates may be properly slotted in the factory, and the knock-outs are unnecessary.

Where the casing is to extend lengthwise over the pipes, leaving a valve stem to project through the top as in Fig. 2, then the top plate may be provided with knock-outs 34 at opposite ends so that either one of these may be removed according to the point at which the operating stem of the valve is located.

Figure 8:
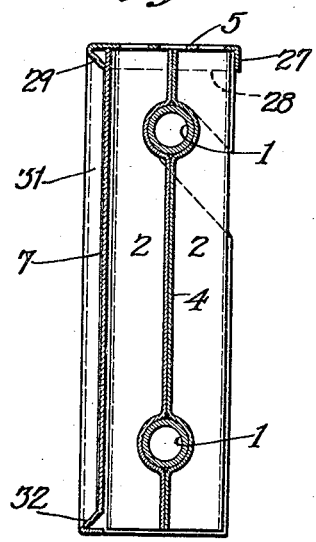
Fig. 8 is a section on the line 8—8 of Fig. 5.

The top, ends and front panel are readily stamped out and bent to the flanged and molded shapes described. They are then assembled in a jig and spot welded or otherwise firmly jointed. The molding at the lower edge of the panel may be integral with the panel, as in Fig. 8, or a separate strip welded to the sheet as in Fig. 13. The casing is intended to fit fairly closely about the radiator. It should also be held firmly against displacement thereon.

Where a top-discharge of the hot air is permissible, as in the usual location immediately below a window, the casing may rest directly on top of the radiator, as in Fig. 8. Where a front-discharge of hot air is desired, the top 5 has a depending flange 35 at the back, at the lower edge of which is an angle iron 36, a flange of which projects over the top of the radiator. The angle iron is secured to the plate 35 and may extend along the entire length thereof or may be in short lengths located at intervals along the plate.

To prevent longitudinal displacement of the casing with relation to the radiator, the front panel 7 has secured to it near its ends, vertical angles 37 (Fig. 9) whose inwardly projecting flanges bear against transverse fins 2 of the radiator. To prevent the lower free edge of the front panel from becoming bulged or otherwise distorted in time, it is preferable to fasten it also to the radiator. This is done by clips, such as are shown in Fig. 13, embracing the edge of the panel and also embracing the lower end of a longitudinal web 3 of the radiating structure. There may be two of these clips, one at each end of the panel, or more, if the panel be of considerable length.

The clip is of spring metal with a hollow central portion 38 adapted to embrace the edges of the parts. An inner flange 39 facilitates introducing it over the web 3. An outer flange 40 is shaped to fit the molding 32 on the panel and to permit the forcing of the clip up over this molding. Thin spacer blocks 41 are introduced between the panel 7 and the web 3 to hold the parts rigidly and at a determined slight distance apart. Or the spacers may be omitted and the clips proportioned so as to clamp the plate 7 against the webs 3, as shown for example in Figs. 9 and 10. And, in general, the variations shown in detail in each of the several figures are applicable to the styles of casing shown in each of the other figures.

It will be observed that the transverse fins 2 of the radiating structure form alternately flues which are closed by the outer webs 3 and channels which are closed on three sides, but open on the outer side. When the casing is applied, the front panel thereof substantially or approximately covers the outer sides of these channels and converts them into flues closed in cross-section. Such flues have an important function in securing a very rapid heating and circulating effect by the induced draft of the heated air.

Whether the radiator be suspended above the floor or supported thereon, the casing should have its lower edge clear the floor or have openings at or near the bottom for admitting air to the lower ends of the radiator flues and channels. The invention may be applied also to radiators supported by legs resting on the floor. And, however the radiator is supported, the pipes may pass through the floor and directly upward to the valves.

The slots in the end walls may be of various other shapes than that shown. For example, they may extend horizontally inward from the edge and then upward.

No claim is made in the present application involving the construction of the radiator, such claims being presented in a divisional application No. 431,118 filed February 25, 1930.

Various modifications may be made by those skilled in the art without departing from the invention as defined in the following claims.

What I claim is;

1. In a casing for a radiator, comprising top, front and side sections one of which is perforated at least in part to permit the egress of heated air, means to support the casing upon a radiator, and means to restrain the same from lateral displacement thereon, said supporting and restraining means comprising projection members extending interiorly from the casing and adapted to engage a radiator surface.

2. In a casing for a radiator, comprising top, front and side sections one of which is perforated at least in part to permit the egress of heated air, the said side sections of said casing being provided with knock-out sections to adapt the casing for mounting over projections on a radiator, means to support the casing upon the radiator and means to restrain the same from lateral movement thereon, said means comprising projection members extending interiorly from the casing and adapted to engage a radiator surface.

3. In a casing for a radiator, comprising top, front and side sections one of which is perforated at least in part to permit the egress of heated air, means to support the casing upon a radiator, means to restrain the same from lateral movement thereon, and spring clip means to affix the bottom of the front section to a radiator in spaced relation thereto.

IRVING T. BENNETT.